(12) United States Patent  
Sharma et al.

(10) Patent No.: US 8,407,509 B2  
(45) Date of Patent: Mar. 26, 2013

(54) METHOD FOR COMPENSATING FOR VARIATIONS IN DATA TIMING

(75) Inventors: Rajeev Sharma, Faridabad (IN); Ajay Kumar, Darapur Tanda Urmar (IN); Naresh Dhamija, Greater Noida (IN); Atul Gupta, Noida (IN); Ajay K. Gaite, New Delhi (IN); Llamparidhi l, Bangalore (IN)

(73) Assignee: Freescale Semiconductor, Inc., Austin, TX (US)

( * ) Notice: Subject to any disclaimer, the term of this patent is extended or adjusted under 35 U.S.C. 154(b) by 324 days.

(21) Appl. No.: 12/901,579

(22) Filed: Oct. 11, 2010

(65) Prior Publication Data

US 2012/0089857 A1     Apr. 12, 2012

(51) Int. Cl.
  *G06F 1/04* (2006.01)
  *G06F 13/00* (2006.01)
  *G06F 13/42* (2006.01)

(52) U.S. Cl. .................. 713/401; 713/503; 711/167

(58) Field of Classification Search ................ 710/8, 10, 710/15, 58, 100, 106; 713/400, 401, 503
  See application file for complete search history.

(56) References Cited

U.S. PATENT DOCUMENTS

| 7,443,741 | B2 | 10/2008 | Butt |
| 7,567,104 | B2 | 7/2009 | Ku |
| 2003/0182595 | A1* | 9/2003 | Carnevale et al. ............. 714/25 |
| 2004/0143775 | A1* | 7/2004 | Li et al. ......................... 713/401 |
| 2007/0008791 | A1 | 1/2007 | Butt |
| 2007/0143649 | A1* | 6/2007 | Yuan ............................. 714/718 |
| 2007/0176658 | A1* | 8/2007 | Ishikawa ....................... 327/161 |
| 2008/0191771 | A1* | 8/2008 | Ku et al. ....................... 327/235 |
| 2008/0276133 | A1* | 11/2008 | Hadley et al. .................... 714/56 |
| 2009/0251976 | A1* | 10/2009 | Amarilio et al. ......... 365/189.15 |

OTHER PUBLICATIONS

Graham Allan and Jody Defazio, Challenge of Implementing an Interface to Off-Chip DDR SDRAM, DesignCon 2007.
Micron Technical Note TN-04-54, High-Speed DRAM Controller Design Introduction, Micron Technologies, Inc. 2008.
Allan, Graham, DDR IP Integration: How to Avoid Landmines in this Quickly Changing Landscape, Chip Design Magazine Jun./Jul. 2007.
Verma, Seyi, How to Implement High Speed 667 Mbps DDR2 Interfaces with FPGAs, ER TIMES, Dec. 5, 2006.
Manoj Roge et al., Calibration Techniques for High-Bandwidth Source-Synchronous Interfaces, DesignCon 2007.

* cited by examiner

*Primary Examiner* — Thomas J Cleary
(74) *Attorney, Agent, or Firm* — Charles Bergere

(57) ABSTRACT

A method for compensating for variations in timing of data sent to a processor on data bit lines relative to a strobe clock sent to the processor on a strobe clock line that can be used in a dual data rate (DDR) memory identifies discrete minimum and maximum time offset values for test data in selected data bit patterns for the data bit lines. The discrete minimum time offset value is the minimum timing adjustment required to allow the processor to receive the data in a steady-state condition during a data valid window of the strobe clock and the discrete maximum time offset value is a maximum timing adjustment required to allow the processor to receive the data in a steady-state condition during a data valid window of the strobe clock. The discrete minimum and maximum time offset values identify a valid range when the data bit lines supply data in a steady-state condition for latching into the processor by the strobe clock.

20 Claims, 6 Drawing Sheets

METHOD FOR COMPENSATING FOR VARIATIONS IN DATA TIMING

FIELD OF THE INVENTION

The present invention relates to compensating for variations in timing of data sent on data bit lines relative to a strobe clock sent on a strobe clock line.

Many electronic systems send data with an associated strobe clock from a memory to a processor over a link, such as Dual data rate (DDR) systems (e.g., DDR2 and DDR3). The link in these DDR systems can be relatively long and includes data bit lines and a strobe clock line, each having an inherent impedance that affects the speed at which data and the strobe clock are transmitted. These impedances can interact with data bit patterns transmitted on the data bit lines and thus the data and strobe clock timing may become skewed by the time they reach the processor. The skewing of the data relative to the strobe clock can cause erroneous data latching and processing and thus such electronic systems compensate for skewing by selective insertion of discrete time delays inserted into the data bit lines and strobe clock line.

Variations in the length of the link, ambient surroundings, and permutations of the data bit patterns may require a system to identify a maximum skew range and then selectively include discrete delays to compensate for the maximum skew. However, current compensation methods identify the maximum skew range by use of unnecessarily large numbers of data bit patterns and typically require all possible data bit pattern permutations. In addition, current compensation methods attempt to identify the maximum skew range with single static patterns that do not adequately identify the extremities of the skew range. Accordingly current compensation methods are inefficient and time consuming especially when they use all possible data bit permutations. Furthermore, the static patterns used by such current compensation methods may not necessarily identify the outer boundaries of the skew range.

Accordingly, it would be advantageous to be able to efficiently determine memory to processor link skew range boundaries.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
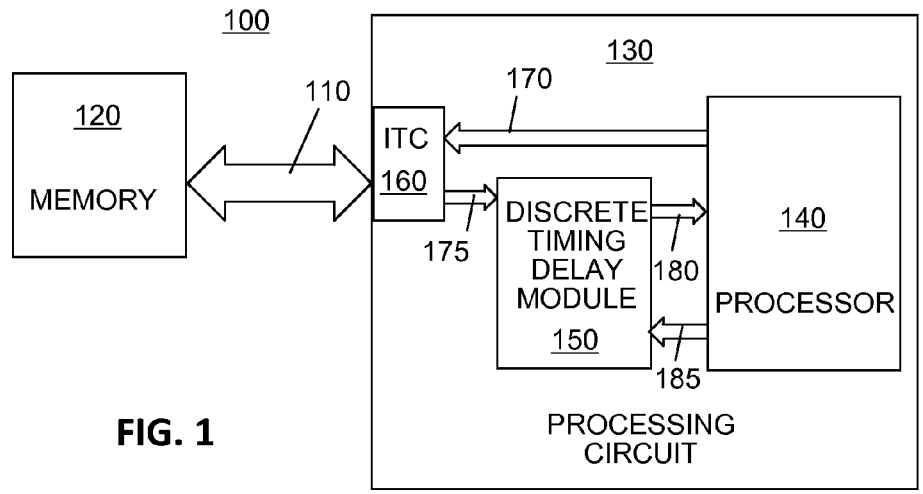
FIG. 1 is a schematic block diagram of a system applicable to embodiments of the present invention.

The detailed description set forth below in connection with the appended drawings is intended as a description of presently preferred embodiments of the invention, and is not intended to represent the only forms in which the present invention may be practiced. It is to be understood that the same or equivalent functions may be accomplished by different embodiments that are intended to be encompassed within the spirit and scope of the invention. In the drawings, like numerals are used to indicate like elements throughout. Furthermore, the term data and test data may be interchanged where appropriate and terms "comprises," "comprising," or any other variation thereof, are intended to cover a non-exclusive inclusion, such that system, circuit, device components and method steps that comprises a list of elements or steps does not include only those elements but may include other elements or steps not expressly listed or inherent to such systems, circuits, devices components or steps. An element or step proceeded by "comprises . . . a" does not, without more constraints, preclude the existence of additional identical elements or steps that comprises the element or step.

In one embodiment, the present invention provides a method for compensating for variations in timing of data sent on data bit lines relative to a strobe clock sent on a strobe clock line. The data bit lines and the strobe clock line form a link coupling a memory to a processing circuit. The processing circuit includes a processor and selectable discrete time delays insertable between the processor and link. The strobe clock and the data are sent concurrently over the link from the memory to the processor. The method includes the processing circuit sending a request to the memory for selected data bit patterns to be sent from the memory to the processing circuit on the data bit lines. The method then performs receiving, at the processing circuit, a set of strobe clocks and the selected data bit patterns. The set of strobe clocks is sent on the strobe clock line and each strobe clock in the set of strobe clocks is sent concurrently from the memory with one of the selected data bit patterns. The selected data bit patterns comprise two alternately received maximum delay data bit patterns that are a one's complement of each other and are common for all of the data bit lines and two alternately received minimum delay data bit patterns for each one of the data bit lines; the two minimum delay data bit patterns being a one's complement of each other. Then a step of identifying a discrete minimum time offset value and a discrete maximum time offset value for test data in the selected data bit patterns for each one of the data bit lines is performed. The discrete minimum time offset value is a minimum timing adjustment required to allow the processor to receive the test data in a steady-state condition during a data valid window of the strobe clock. The discrete maximum time offset value is a maximum timing adjustment required to allow the processor to receive the test data in a steady-state condition during a data valid window of the strobe clock. The discrete minimum and maximum time offset values are used to identify a valid range when each of the data bit lines supply data in a steady-state condition for latching into the processor by the strobe clock. Next a step of selecting a discrete mid-range offset value for the valid range of each of the data bit lines is performed. A step of aligning the data bits using the discrete mid-range offset value by selective inclusion or removal of at least one of the discrete time delays between the processor and link is performed so that the discrete mid-range offset value of each of the data bit lines has a common mid-range value.

In another embodiment, the present invention provides for a system having a link formed from data bit lines and a strobe clock line. The link provides coupling a memory to a processing circuit and the processing circuit includes a processor and selectable discrete time delays insertable between the processor and link. The system performs a method for compensating for variations in timing of data sent the data bit lines relative to a strobe clock sent on the strobe clock line. The strobe clock and the data are sent concurrently over the link from the memory to the processor and the method includes sending a request for selected data bit patterns to be sent from the memory to the processing circuit on the data bit lines. The request is sent from the processing circuit to the memory and the method then performs receiving, at the processing circuit, a set of strobe clocks and the selected data bit patterns. The set of strobe clocks is sent on the strobe clock line and each strobe clock in the set of strobe clocks is sent concurrently from the memory with one of the selected data bit patterns. The selected data bit patterns comprise two alternately received maximum delay data bit patterns that are a one's complement of each other and are common for all of the data bit lines and two alternately received minimum delay data bit patterns for each one of the data bit lines, the two minimum delay data bit patterns being a one's complement of each other. There is then performed a step of identifying a discrete minimum time offset value and a discrete maximum time offset value for test data in the selected data bit patterns for each one of the data bit lines. The discrete minimum time offset value is a minimum timing adjustment required to allow the processor to receive the test data in a steady-state condition during a data valid window of the strobe clock. Also, the discrete maximum time offset value is a maximum timing adjustment required to allow the processor to receive the test data in a steady-state condition during a data valid window of the strobe clock. The discrete minimum time offset value, and discrete maximum time offset value, identify a valid range when each one of the data bit lines supply data in a steady-state condition for latching into the processor by the strobe clock. Next there is performed a step of selecting a discrete mid range offset value for the valid range of each one of the data bit lines. The discrete mid range offset value is determined from the discrete minimum time offset value and a discrete maximum time offset value. An aligning steps is then performed to align the data bits using the discrete mid-range offset value of each of the data bit lines by selective inclusion or removal of at least one of the discrete time delays between the processor and link so that the discrete mid range offset value of every one of the data bit lines has a common mid range value.

Referring now to FIG. 1, a schematic block diagram of a system 100 that uses embodiments of the present invention is shown. The system 100 includes a link 110 coupling a memory 120 to a processing circuit 130. The link 110 includes parallel data bit lines d0 to dn and a strobe clock line SCL. The processing circuit 130 comprises a processor 140, a discrete time delay module 150 and an interface (ITC) 160. The link 110 is connected to the interface 160 and an internal link 170 directly couples the interface 160 to the processor 140. Also, the processor 140 is indirectly coupled to the interface 160 through the time delay module 150 by internal links 175, 180 and control lines 185 provide control signals to the time delay module 150 from the processor 140.

Figure 2:
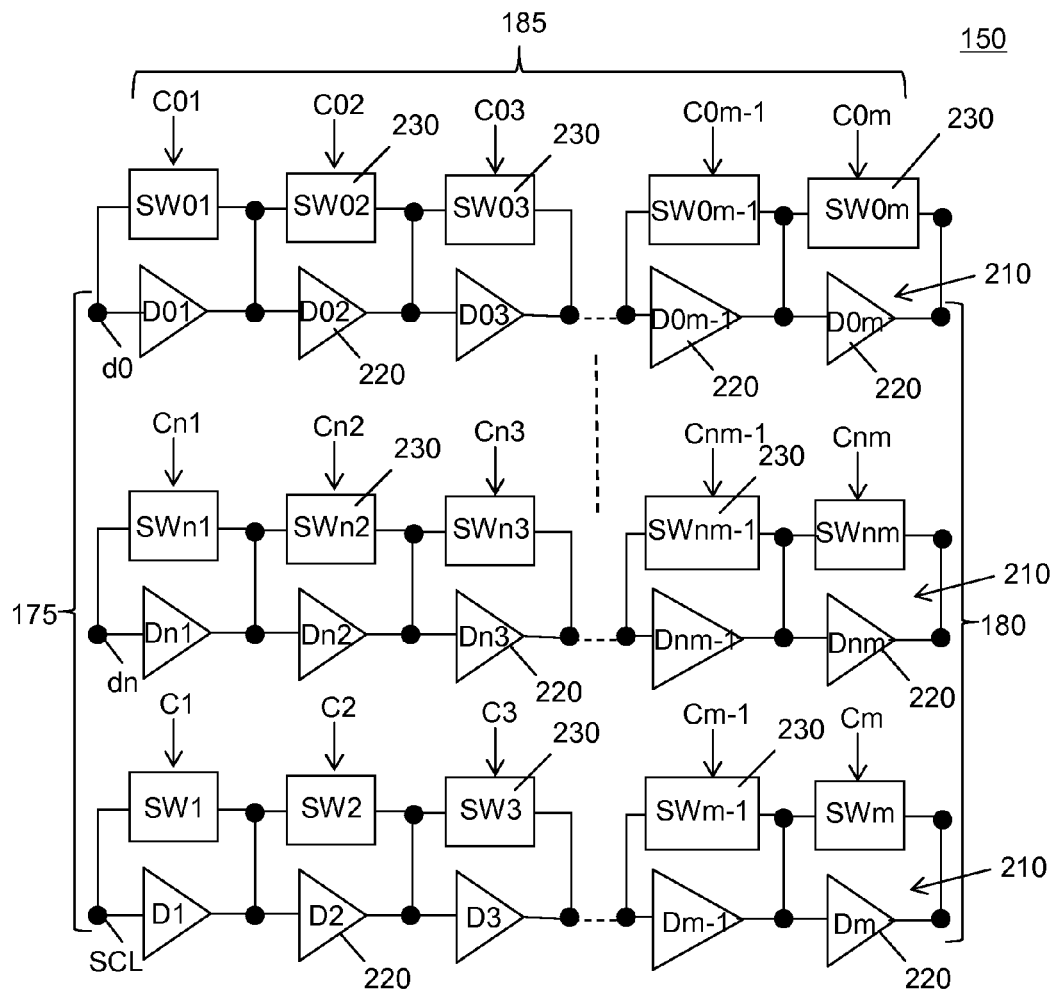
FIG. 2 is a schematic block diagram of a discrete time delay module of FIG. 1.

FIG. 2 is a schematic block diagram of the discrete time delay module 150. The discrete time delay module 150 includes chains 210 of discrete time delays 220 in which the chains 210 each have an input coupled to a respective parallel data bit line d0 to dn or the strobe clock line SCL of the internal link 175. Also, the chains 210 each have an output coupled to a respective parallel data bit line d0 to dn or strobe clock line SCL of the internal link 180. As shown, in this embodiment the chains 210 comprise discrete time delays 220 that can be selectively included (inserted) or removed (bypassed) by switches 230 that are controllable by the processor 140 sending the control signals along the control lines 185. Hence, then length of a chain 210 can be adjusted by the switches 230. For instance, the length of the chain 210 that has selectable discrete time delays 220 of D01 to D0n associated with data bit line d0, can be adjusted by appropriate selection of switches 230 (SW01 to SW0n) by the control signals at control inputs C01 to C0n. Furthermore, the length of the chain 210 that has selectable discrete time delays 220 of Dn1 to Dnm associated with data bit line dn, can be adjusted by appropriate selection of switches 230 (SWn1 to SWnm) by the control signals at control inputs Cn1 to Cnm. Also, the length of the chain 210 that has selectable discrete time delays 220 of D1 to Dm associated with the strobe clock line SCL, can be adjusted by appropriate selection of switches 230 (SW1 to SWm) by the control signals at control inputs C1 to Cm.

Figure 3:
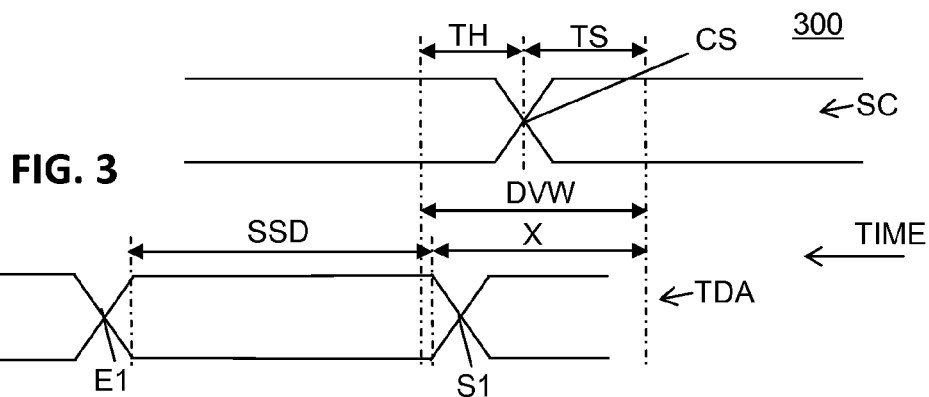
FIG. 3 is a timing diagram of test data on one of the data bit lines of FIG. 1 relative to a strobe clock on a strobe clock line when the system is in an initial calibration condition in accordance with an embodiment of the present invention.

FIG. 3 shows a timing diagram 300 of test data TDA on one of the data bit lines d0 to dn relative to a strobe clock SC on the strobe clock line SCL when the system 100 is in an initial calibration condition in accordance with an embodiment of the present invention. The test data TDA and the strobe clock SC are sent concurrently over the link 110 from the memory 120 and are skewed when received by the processor 140. The skewing is partly due to the inherent characteristics of the link 110, the data bit patterns sent over the link 110 and the insertion of the discrete time delays 220 in each of the data bit lines d0 to dn. In this initial calibration condition the data bit patterns, that form the test data TDA, are alternately sent over the link are maximum delay data bit patterns MADDBP, that are the one's complement of each other, as shown in table 1 below.

TABLE 1

Maximum delay data bit patterns MADDBP for an 8 bit data bus d0 to d7.

| d0 | d1 | d2 | d3 | d4 | d5 | d6 | d7 |
|----|----|----|----|----|----|----|----|
| 0  | 0  | 0  | 0  | 0  | 0  | 0  | 0  |
| 1  | 1  | 1  | 1  | 1  | 1  | 1  | 1  |

The strobe clock SC is a differential strobe with a cross-over CS for latching test data TDA on each of the data bit lines d0 to dn, where the cross-over CS is at a mid-point of a data valid window DVW of the strobe clock SC. As illustrated, the test data TDA has a start S1 and an end E1. Approximately one-half of the data valid window DVW is required for a setup time TS of the test data TDA when in a steady-state condition (steady-state data SSD) before the strobe clock SC, at the cross-over CS, commences latching the test data TDA into the processor 140. Thus the cross-over CS occurs at a latching threshold value. Also, approximately one-half of the data valid window DVW is required for a hold time TH of the steady-state data SSD after the strobe clock SC, at the cross-over CS, begins latching the test data TDA into the processor 140. It should be noted that although a differential strobe is illustrated, a single strobe signal may be used and thus the latching threshold value would occur when the single strobe signal reaches a level equal to the latching threshold value. Also, the test data TDA and the strobe clock SC when sent concurrently over the link 110 from the memory 120 will be received in the following configuration based on the memory 120 specifications: a) Memory sends Test data TDA aligned with cross-over CS such that the start S1 of test data TDA is sent from the memory 120 at the same time as the cross-over CS; b) the Test data TDA is sent earlier than the cross-over CS (as specified by the JEDEC memory specification for maximum value); and c) the Test Data TDA is launched later than the cross-over CS (as specified by JEDEC memory specification for minimum value).

The maximum delay data bit patterns MADDBP are common for all of the data bit lines d0 to dn, and in the initial calibration condition the test data TDA received by the processor 140 is in a non-steady-state (or unknown) condition and is received by the processor 140 after the commencement of the data valid window DVW. More specifically, the Steady-state Data SSD is received by the processor 140 after the cross-over CS of the strobe clock SC (the start S1 occurs after the cross-over CS).

The timing diagram 300 illustrates that in the initial calibration condition there is a time difference X (delay) between the commencement of the data valid window DVW and the commencement of the Steady-state Data SSD on a data line.

Figure 4:
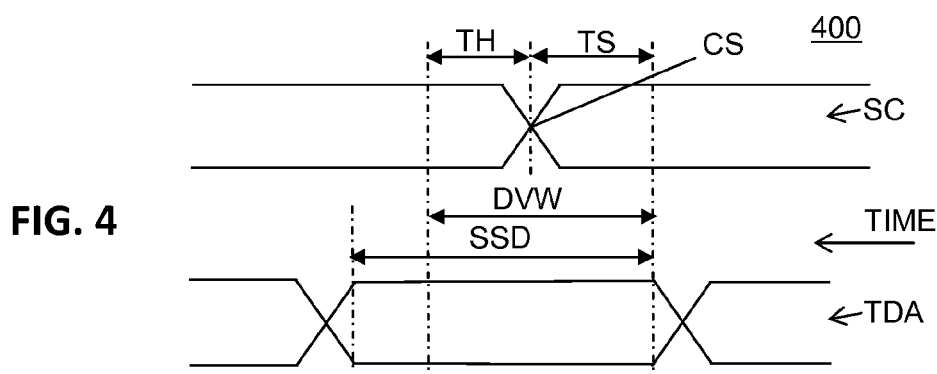
FIG. 4 is a timing diagram of the test data on one of the data bit lines of FIG. 1 relative to the strobe clock on the strobe clock line when the system is being calibrated, based on the initial calibration condition of FIG. 3, in accordance with an embodiment of the present invention.

Referring to FIG. 4 there is illustrated another timing diagram 400 of the test data TDA on one of the data bit lines d0 to dn relative to the strobe clock SC on the strobe clock line SCL when the system 100 is being calibrated, based on the initial calibration condition of FIG. 3, in accordance with an embodiment of the present invention. As shown, the time difference X (delay) has been eliminated by suitable selective insertion (selection) or removal (de-selection) of the discrete time delays 220 of the appropriate chains 210 (as described later) thereby allowing for an identifying of a discrete minimum time offset value DMITOV that is related to the time difference X.

Figure 5:
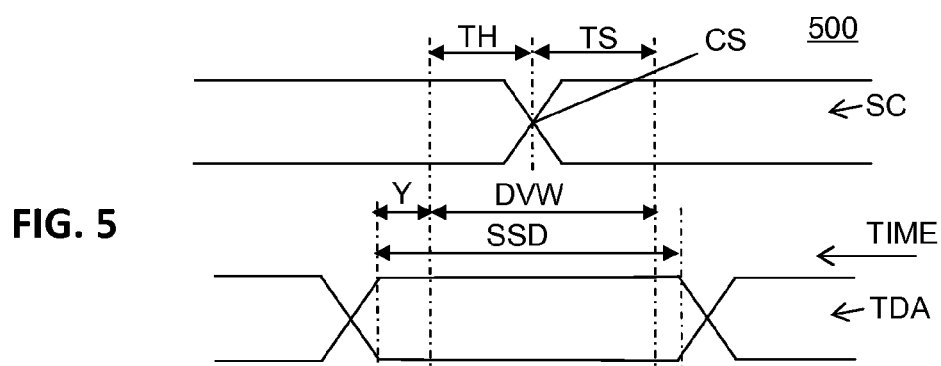
FIG. 5 is a timing diagram of the test data on one of the data bit lines of FIG. 1 relative to the strobe clock on the strobe clock line when the system is being calibrated, based on the initial calibration condition of FIG. 3, in accordance with an embodiment of the present invention.

Referring to FIG. 5, another timing diagram 500 of the test data TDA on one of the data bit lines d0 to dn relative to the strobe clock SC on the strobe clock line SCL when the system 100 is being calibrated, based on the initial calibration condition of FIG. 3, in accordance with an embodiment of the present invention, is shown. The timing diagram 500 illustrates a shifting of the steady-state data SSD relative to the data valid window DVW of the strobe clock SC as compared with the timing diagram 400. This shifting occurs simply by selectively replacing the maximum delay data bit patterns MADDBP with minimum delay data bit patterns MIDDBP as illustrated in tables 2 and 3 below.

TABLE 2

A first set of minimum delay data bit patterns MIDDBP for an 8 bit data bus d0 to d7.

| d0 | d1 | d2 | d3 | d4 | d5 | d6 | d7 |
|----|----|----|----|----|----|----|----|
| 1  | 0  | 0  | 0  | 0  | 0  | 0  | 0  |
| 0  | 1  | 0  | 0  | 0  | 0  | 0  | 0  |
| 0  | 0  | 1  | 0  | 0  | 0  | 0  | 0  |
| 0  | 0  | 0  | 1  | 0  | 0  | 0  | 0  |
| 0  | 0  | 0  | 0  | 1  | 0  | 0  | 0  |
| 0  | 0  | 0  | 0  | 0  | 1  | 0  | 0  |
| 0  | 0  | 0  | 0  | 0  | 0  | 1  | 0  |
| 0  | 0  | 0  | 0  | 0  | 0  | 0  | 1  |

TABLE 3

A second set of minimum delay data bit patterns MIDDBP for an 8 bit data bus d0 to d7.

| d0 | d1 | d2 | d3 | d4 | d5 | d6 | d7 |
|----|----|----|----|----|----|----|----|
| 0  | 1  | 1  | 1  | 1  | 1  | 1  | 1  |
| 1  | 0  | 1  | 1  | 1  | 1  | 1  | 1  |
| 1  | 1  | 0  | 1  | 1  | 1  | 1  | 1  |
| 1  | 1  | 1  | 0  | 1  | 1  | 1  | 1  |
| 1  | 1  | 1  | 1  | 0  | 1  | 1  | 1  |
| 1  | 1  | 1  | 1  | 1  | 0  | 1  | 1  |
| 1  | 1  | 1  | 1  | 1  | 1  | 0  | 1  |
| 1  | 1  | 1  | 1  | 1  | 1  | 1  | 0  |

With reference to tables 2 and 3, for data bit d0 the minimum delay data bit patterns MIDDBP used to achieve this shifting are 10000000 and 01111111. These minimum delay data bit patterns MIDDBP are the one's compliment of each other and are received alternately at the processor 140. As another example, for data bit d2 the minimum delay data bit patterns MIDDBP used to achieve this shifting are 00100000 or 11011111.

Figure 6:
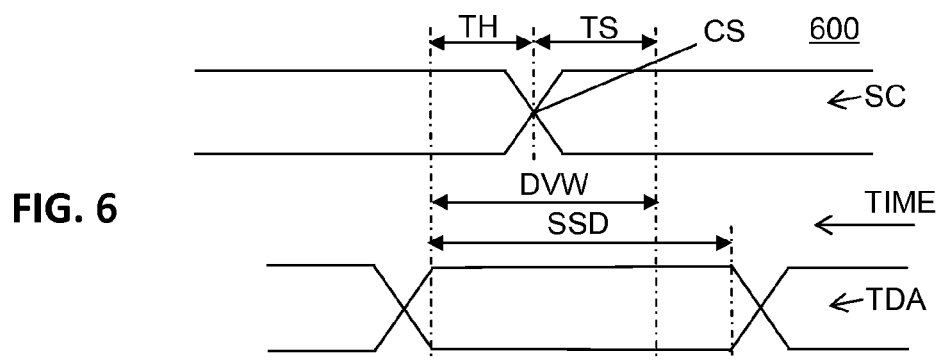
FIG. 6 is a timing diagram of the test data on one of the data bit lines of FIG. 1 relative to the strobe clock on the strobe clock line when the system is being calibrated, based on the initial calibration condition of FIG. 3, in accordance with an embodiment of the present invention.

The timing diagram 500 illustrates that there is a time difference Y between the end of the data valid window DVW and the end of the Steady-state Data SSD on a data line. Referring to FIG. 6 there is illustrated another timing diagram 600 of the test data TDA on one of the data bit lines d0 to dn relative to the strobe clock SC on the strobe clock line SCL when the system 100 is being calibrated, based on the initial calibration condition of FIG. 3, in accordance with an embodiment of the present invention. As shown, the time difference Y has been eliminated by suitable selective insertion (selection) or removal (de-selection) of the discrete time delays 220 of the appropriate chains 210 (as described later) thereby allowing for an identifying of a discrete maximum time offset value DMATOV that is related to the time difference Y.

Figure 7:
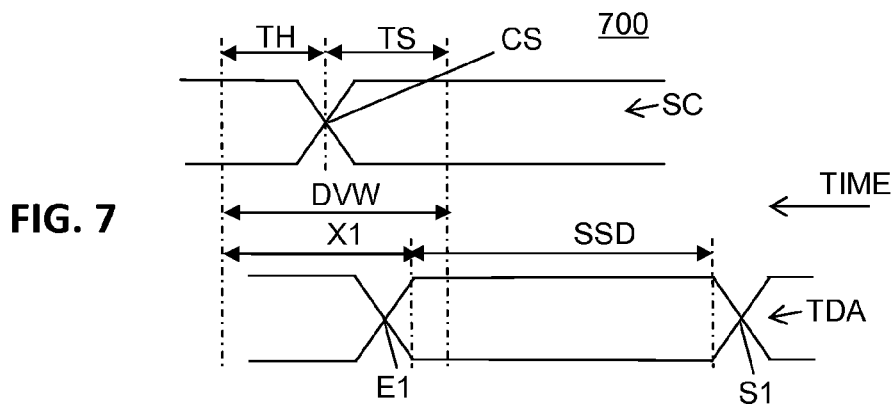
FIG. 7 is a timing diagram of the test data on one of the data bit lines of FIG. 1 relative to the strobe clock on the strobe clock line when the system is in another initial calibration condition in accordance with an embodiment of the present invention.

Referring to FIG. 7 there is illustrated another timing diagram 700 of the test data TDA on one of the data bit lines d0 to dn relative to the strobe clock SC on the strobe clock line SCL when the system 100 is in another initial calibration condition in accordance with an embodiment of the present invention. The test data TDA and the strobe clock SC are sent concurrently over the link 110 from the memory 120 and are skewed when received by the processor 140. However, there are sufficient discrete time delays 220 inserted into the strobe clock line SCL to ensure that the cross-over CS occurs after the occurrence of the steady-state data SSD and thus the skewing has been over-compensated for by the insertion of these discrete time delays 220. As before, the skewing is partly due to the inherent characteristics of the link 110, the data bit patterns sent over the link 110 and the insertion of the discrete delays 220 in each of the data bit lines d0 to dn. In this initial calibration condition, the data bit patterns that are alternately sent over the link are the minimum delay data bit patterns MIDDBP, as shown in tables 2 and 3.

In this initial calibration condition, the test data TDA received by the processor 140 is in a non steady-state (or unknown) condition at the cross-over CS of the strobe clock SC. The cross-over CS (latching threshold value) is again at a midpoint of the data valid window DVW and approximately one half of the data valid window DVW is required for a setup time TS of steady-state data DA before the strobe clock SC, at the cross-over CS, commences latching the test data TDA into the processor 140. Also, approximately one half of the data valid window DVW is required for a hold time TH of the steady-state data SSD after the strobe clock SC, at the cross-over CS, commences latching the test data TDA into the processor 140. Again it will be apparent that single strobe signal may be used and thus the latching threshold value would occur when the single strobe signal reaches level equal to the latching threshold value.

Figure 8:
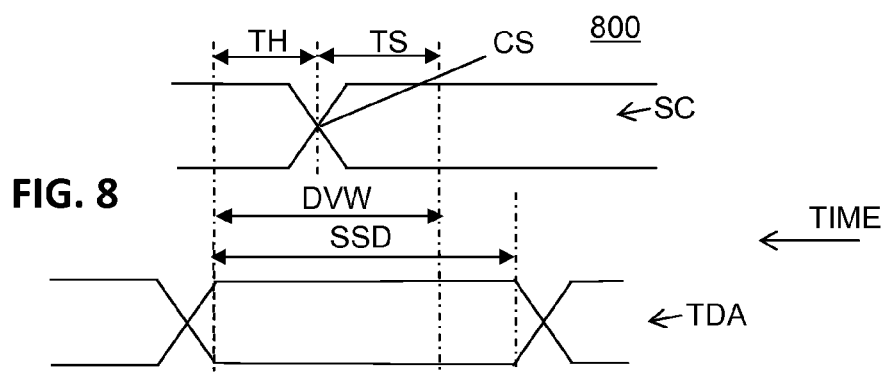
FIG. 8 is a timing diagram of the test data on one of the data bit lines of FIG. 1 relative to the strobe clock on the strobe clock line when the system is being calibrated, based on the initial calibration condition of FIG. 7, in accordance with an embodiment of the present invention.

The diagram 700 illustrates that in the initial calibration condition there is a time difference X1 between the end of the data valid window DVW and the end of the Steady-state Data SSD on a data line. Referring to FIG. 8 there is illustrated another timing diagram 800 of the test data TDA on one of the data bit lines d0 to dn relative to the strobe clock SC on the strobe clock line SCL when the system 100 is being calibrated, based on the initial calibration condition of FIG. 7, in accordance with an embodiment of the present invention. As shown, the time difference X1 has been eliminated by suitable selective insertion (selection) or removal (de-selection) of the discrete time delays 220 of the appropriate chains 210 (as described later) thereby allowing for an identifying of a discrete maximum time offset value DMATOV that is related to the time difference X1.

Figure 9:
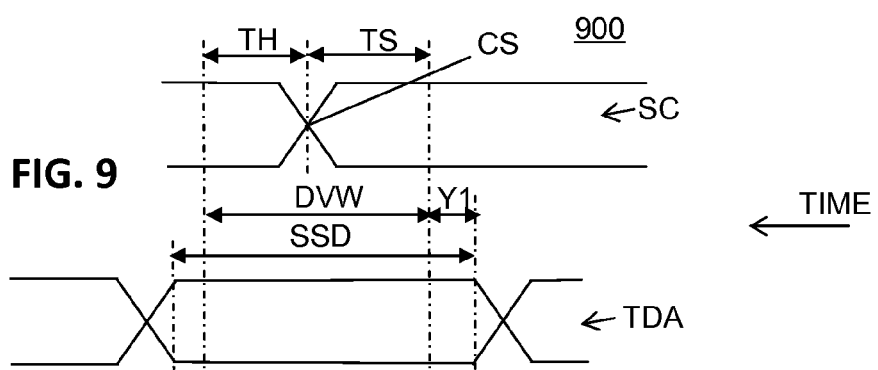
FIG. 9 is a timing diagram of the test data on one of the data bit lines of FIG. 1 relative to the strobe clock on the strobe clock line when the system is being calibrated, based on the initial calibration condition of FIG. 7, in accordance with an embodiment of the present invention.

Referring to FIG. 9, there is illustrated another timing diagram 900 of the test data TDA on one of the data bit lines d0 to dn relative to the strobe clock SC on the strobe clock line SCL when the system 100 is being calibrated, based on the initial calibration condition of FIG. 7, in accordance with an embodiment of the present invention. The timing diagram 900 illustrates the a shifting of the steady-state data SSD relative to the valid window of the strobe as compared with the timing diagram 800. This shifting occurs simply by selectively replacing the minimum data bit patterns or pattern MIDDBP with appropriate maximum delay data bit pattern MADDBP as illustrated in table 1.

Figure 10:
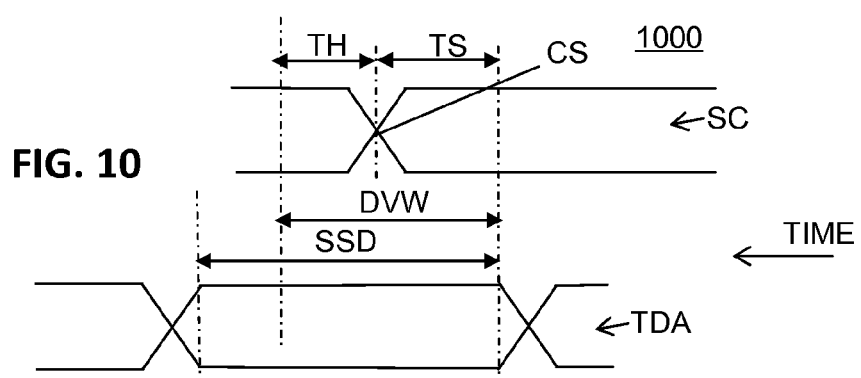
FIG. 10 is a timing diagram of the test data on one of the data bit lines of FIG. 1 relative to the strobe clock on the strobe clock line when the system is being calibrated, based on the initial calibration condition of FIG. 7, in accordance with an embodiment of the present invention.

The timing diagram 900 illustrates that in there is a time difference Y1 between the beginning of the data valid window DVW and the beginning of the steady-state data SSD on a data line. Referring to FIG. 10 there is illustrated another timing diagram 1000 of the test data TDA on one of the data bit lines d0 to dn relative to the strobe clock SC on the strobe clock line SCL when the system 100 is being calibrated, based on the initial calibration condition of FIG. 7, in accordance with an embodiment of the present invention. As shown, the time difference Y1 has been eliminated by suitable selective insertion (selection) or removal (de-selection) of the discrete time delays 220 of the appropriate chains 210 (as described later) thereby allowing for an identifying of a discrete minimum time offset value DMITOV that is related to the time difference Y1.

Figure 11:
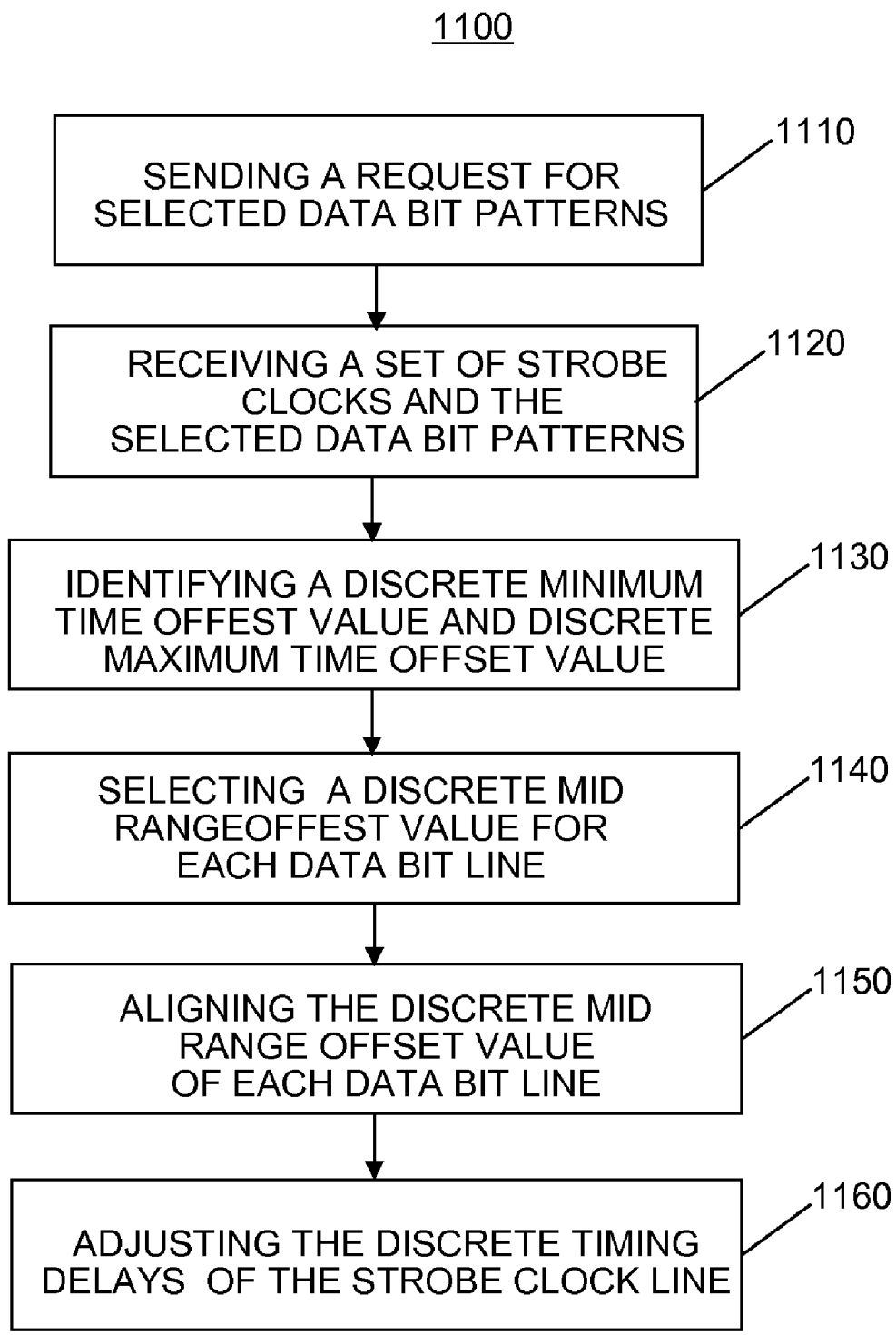
FIG. 11 is a flow chart illustrating a method for compensating for variations in timing of data sent on the data bit lines of FIG. 1 relative to the strobe clock sent on the strobe clock line in accordance with an embodiment of the present invention.

Referring to FIG. 11 there is a flow diagram illustrating a method 1100 for compensating for variations in timing of data DA sent on the data bit lines d0 to dn relative to the strobe clock SC sent on the strobe clock line SCL in accordance with a preferred embodiment of the present invention. The data bit lines d0 to dn and the strobe clock line SCL form the link 110 that couples the memory 120 to the processing circuit 130 and the method 1100 is performed on the system 100 and therefore the strobe clock SC and the data DA are sent concurrently over the link 110 from the memory 120 to the processor 140.

The method 1100 includes, at a sending block 1110, a sending of a request for selected data bit patterns SDBP to be sent from the memory 120 to the processing circuit 130 on the data bit lines d0 to dn. This request is sent from the processing circuit 130 to the memory 120. The selected data bit patterns are some or all of the minimum delay data bit patterns MIDDBP and maximum delay data bit patterns MADDBP as illustrated for 8 data bits in Tables 1 to 3.

At a receiving block 1120, the method 1100 performs receiving at the processing circuit 130 a set of strobe clocks and the selected data bit patterns SDBP, the set of strobe clocks being sent on the strobe clock line SCL and each strobe clock SC in the set of strobe clocks is sent concurrently from the memory 120 with one of the selected data bit patterns SDBP. The selected data bit patterns SDBP comprise: (a) two alternately received maximum delay data bit patterns MADDBP that are a one's complement of each other and are common for all the data bit lines d0 to dn; and (b) two alternately received minimum delay data bit patterns MIDDBP for each of the data bit lines d0 to dn, the two minimum delay data bit patterns being a one's complement of each other. For instance, the maximum delay data bit patterns MADDBP comprise data bits on all data bit lines d0 to dn having the same logic values which alternate (toggle) between all ones and all zeros for each consecutive sent strobe clock SC. Also, consider data bit line d0, the minimum delay bit patterns MIDDBP for data bit line d0 comprise data bits on all other data bit lines d1 to dn having a logic value opposite to the a logic value on the selected data bit line d0 of the data bit lines d0 to dn. Thus, the minimum delay bit patterns MIDDBP for data bit line d0 for an 8 bit data bus sent concurrently with the strobe clock SC alternate (toggle) between 01111111 and 10000000. As another example, the minimum delay bit patterns MIDDBP for data bit line d4 for an 8 bit data bus alternate between 11110111 and 000001000.

At an identifying block 1130 the method 1100 performs identifying the discrete minimum time offset value DMITOV and the discrete maximum time offset value DMATOV for the test data TDA in the selected data bit patterns SDBP for each one of the data bit lines d0 to dn. The discrete minimum time offset value DMITOV is related to the time difference X or Y1 and is a minimum timing adjustment required to allow the processor to receive the test data TDA in a steady-state condition (the steady-state data SSD) during a data valid window DVW of the strobe clock SC. Also, the discrete maximum time offset value DMATOV is related to the time difference Y or X1 and is a maximum timing adjustment required to allow the processor 140 to receive the data DA in a steady-state condition (the steady-state data SSD) during a data valid window DVW of the strobe clock SC. Further, the discrete minimum time offset value DMITOV and discrete maximum time offset value DMATOV identify a valid range VR when each one of the data bit lines d0 to dn supply data DA in a steady-state condition (the steady-state data SSD) for latching into the processor 140 by the strobe clock SC. From the above, it will be apparent that the discrete minimum offset value DMITOV and discrete maximum time offset value DMATOV are identified by counting the discrete time delays 220 in a relevant chain 210.

The method 1100 then performs, at a selecting block 1140, selecting a discrete mid range offset value MROV of each of the data bit lines d0 to dn. The discrete mid range offset value MROV is determined from the discrete minimum time offset value DMITOV and a discrete maximum time offset value DMATOV. In one embodiment, the discrete mid range offset value MROV is intermediate the discrete minimum time offset value DMITOV and discrete maximum time offset value DMATOV and is an average value of the discrete minimum time offset value DMITOV and discrete maximum time offset value DMATOV. However, in another embodiment the discrete minimum time offset value DMITOV is determined as a mid value of a Valid Range Length (VRL) for each of the data bits do to dn. This VRL is calculated as the difference between the discrete minimum time offset DMITOV and the discrete maximum time offset value DMATOV for each of the data bits do to dn. Next, at an aligning block 1150, a step of aligning the data bits using the discrete mid-range offset value of each of the data bit lines do to dn by selective inclusion or removal of at least one of the discrete time delays 220 between the processor 140 and link 110 so that the discrete mid-range offset value of each of the data bit lines has a common mid range value CMRV is performed. As a result, all the data bits will be aligned and de-skewed for any static and dynamic delays due to the processor 140, the memory 120 and the link 110. More specifically, the aligning of the discrete mid range offset value MROV includes adjusting the discrete time delays 220 of the strobe clock line SCL by selecting one of the data bit lines as a reference data bit line with a reference discrete mid range offset value RMROV and adding or removing the discrete time delays 220 in one or more of the other data bit lines d0 to dn.

Finally, at an adjusting block 1160, the method 1100 performs adjusting the discrete time delays 220 of the strobe clock line SCL by selective inclusion or removal of at least one of the discrete time delays 220 between the processor 140 and the link 110. Ideally, the midpoint value, that is typically the cross-over CS of the data valid window DVW, is aligned with the common mid range value CMRV. Also, it should be noted that the adjusting of the discrete time delays 210 includes adjusting the discrete time delays 210 of the strobe line SL to align with the midpoint value of each of the aligned data bit lines.

Figure 12:
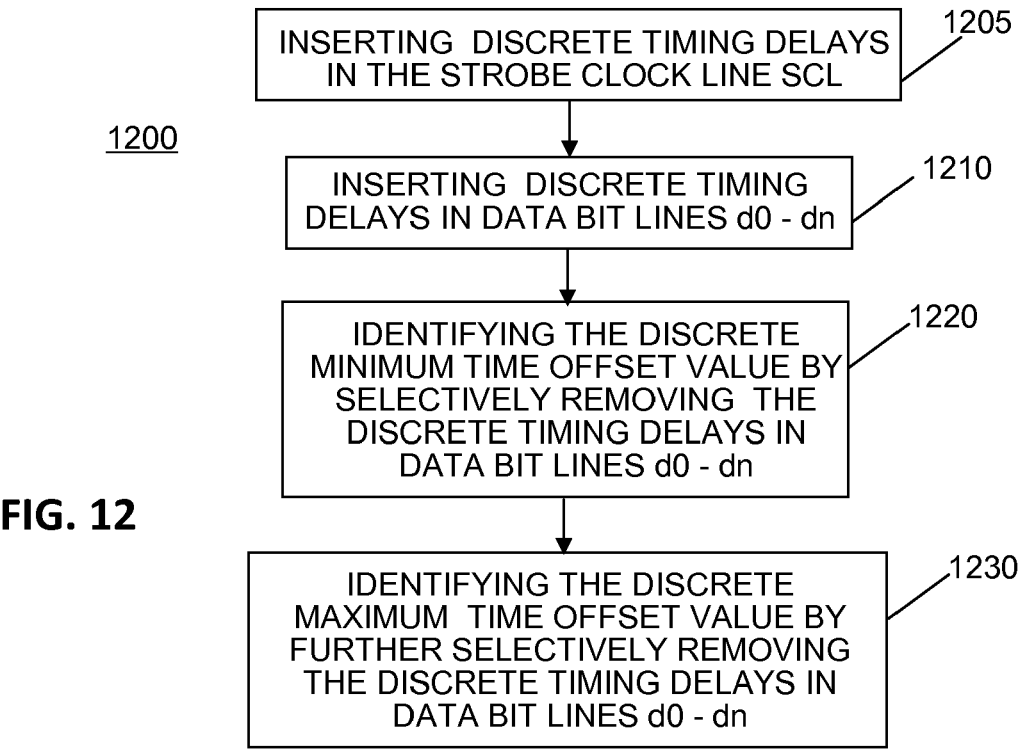
FIG. 12 is a flow chart illustrating an identifying process for performing the identifying step of FIG. 11 in accordance with one embodiment of the present invention.

Referring to FIG. 12, a flow chart illustrating an identifying process 1200 performed by the identifying block 1130 in accordance with an embodiment of the present invention, is shown. The identifying process 1200 includes, at an inserting block 1205, inserting some of the discrete time delays 220 in the strobe clock line SCL to provide an initial set up delay in the strobe clock line SCL. This initial set up delay is approximately equal (minimal requirement) to the duration of the test data TDA between the start S1 and end E1 plus maximum possible skew of both the memory 120 and link 110. This initial setup delay will cover three cases of skew between test data TDA and Cross-over CS that are launched from the memory 120 as follows: a) CS and TDA are aligned; b) TDA is earlier than CS; and c) CS is earlier than TDA. This initial setup delay is required to properly sample the minimum and maximum delay offsets.

The method 1200 then performs, at an inserting block 1210, inserting a plurality of the discrete time delays 220 in the data bit lines d0 to dn to ensure that initially the test data TDA received by the processor 140 is in a non steady-state condition at the cross-over CS (latching threshold value) of the strobe clock SC. This inserting at block 1210 provides for the time difference X (timing offset) of test data TDA on the data bit lines d0 to dn relative to the strobe clock SC as shown in the timing diagram 300. Next, at an identifying block 1220, there is performed identifying the discrete maximum time offset value DMATOV by selectively removing (by decrementing) the discrete time delays 220 in the data bit lines d0 to dn whilst the maximum delay data bit patterns MADDBP are sent until the processor 140 receives the test data TDA in a steady-state condition at the commencement of one of the data valid windows DVW. The result of the identifying block 1220 is the elimination of the time difference X as shown in the timing diagram 400. The process 1200, at an identifying block 1230, then performs identifying the discrete minimum time offset value DMITOV by further selectively removing (by decrementing) the discrete time delays 220 in the data bit lines d0 to dn whilst the minimum delay data bit patterns MIDDBP are sent and whilst the processor 140 continues to receive the test data TDA in a steady-state condition during the data valid windows DVWs of the strobe clock SC. The result of the identifying block 1230 is the elimination of the time difference Y as shown in the timing diagrams 500 and 600.

Figure 13:
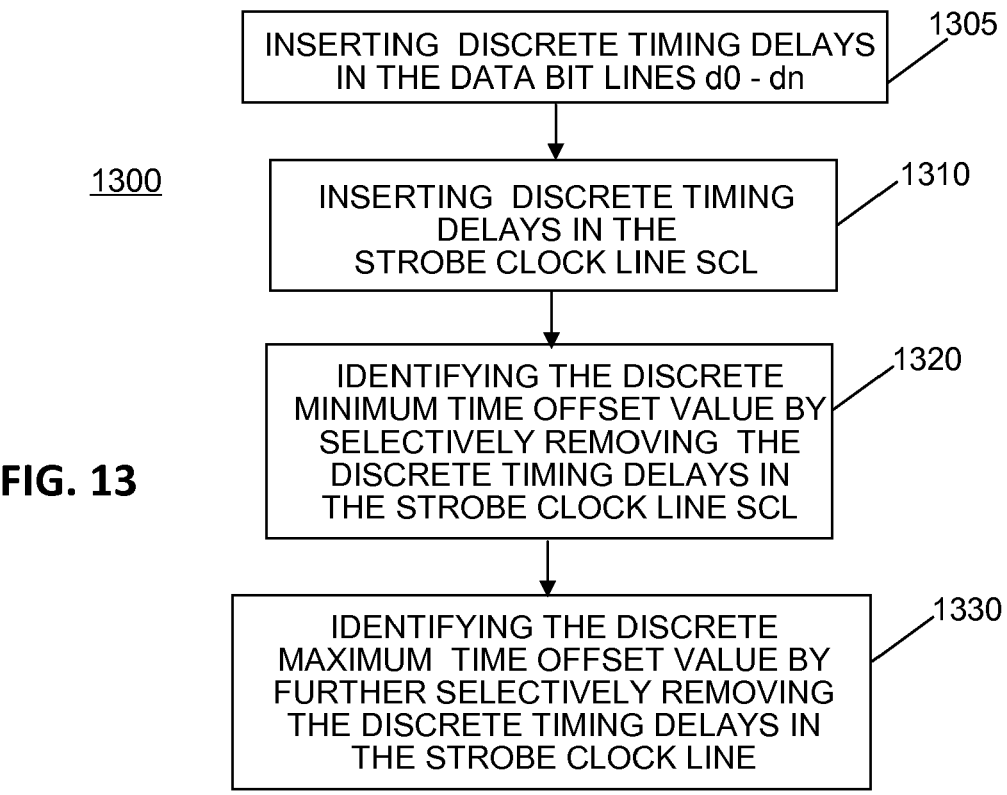
FIG. 13 is a flow chart illustrating an alternative identifying process for performing the identifying process of FIG. 11 in accordance with an embodiment of the present invention.

Referring to FIG. 13 a flow chart illustrating an alternative identifying process 1300 to be performed by the identifying block 1130 in accordance with an embodiment of the present invention is shown. The identifying process 1300 includes, at an inserting block 1305, inserting some of the discrete time delays 220 in the data bit lines do to dn to provide initial setup delays in each of the data bit lines d0 to dn. This initial set up delay minimum requirement is determined from the maximum possible skew of both the memory 120 and link 110. The initial setup delay covers the three cases of skew between test data TDA and Cross-over CS namely a) CS and TDA are aligned; b) TDA is early than CS; and c) CS is earlier than TDA.

The method 1300 then performs, at an inserting block 1310, inserting a plurality of the discrete time delays 220 in the strobe clock line SCL to ensure that initially the test data TDA received by the processor 140 is in a non steady-state condition at the cross-over CS (latching threshold value) of the strobe clock SC. This inserting at block 1310 provides for the time difference X1 (timing offset) of test data TDA on the data bit lines d0 to do relative to the strobe clock SC as shown in the timing diagram 700. Next, at an identifying block 1320, there is performed identifying the discrete maximum time offset value DMATOV by selectively removing (by decrementing) the discrete time delays 220 in the strobe clock line SCL whilst the minimum delay data bit patterns MIDDBP are sent until the processor 140 receives the test data TDA in a steady-state condition at the commencement of one of the data valid windows DVWs. The result of the identifying block 1320 is the elimination of the time difference X1 as shown in the timing diagram 800. The process 1300, at an identifying block 1330, then performs identifying the discrete minimum time offset value DMITOV by further selectively removing (by decrementing) the discrete time delays 220 in the strobe clock line SCL whilst the maximum delay data bit patterns MADDBP are sent and whilst the processor 140 continues to receive the test data TDA in a steady-state condition during data valid windows DVWs of the strobe clock SC. The result of the identifying block 1330 is the elimination of the time difference Y1 as shown in the timing diagrams 900 and 1000.

Figure 14:
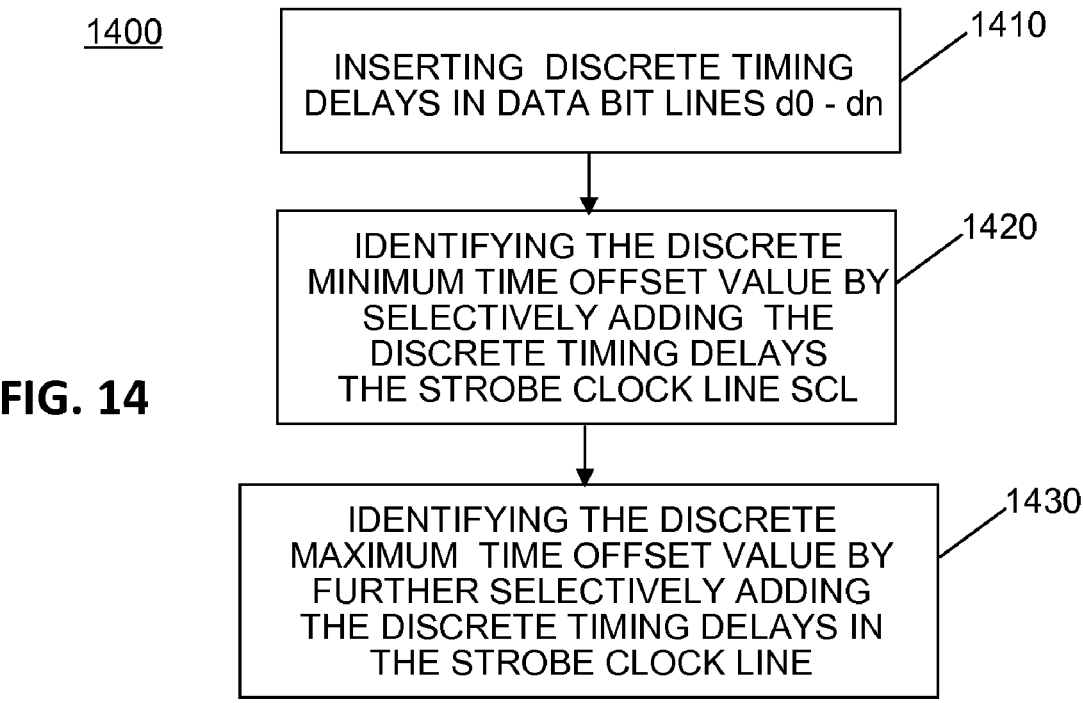
FIG. 14 is a flow chart illustrating another alternative identifying process for performing the identifying process of FIG. 11 in accordance with an embodiment of the present invention.

Referring to FIG. 14 there is a flow diagram illustrating another alternative identifying process 1400 for performing the identifying block 1130 in accordance with an embodiment of the present invention. The identifying process 1400 includes, at an inserting block 1410, inserting a plurality of the discrete time delays 220 in the data bit lines d0 to dn to ensure that initially the test data TDA received by the processor 140 is in a non steady-state condition at the cross-over CS (latching threshold value) of the strobe clock SC. This inserting at block 1410 provides for the time difference X (timing offset) of test data TDA on the data bit lines d0 to dn relative to the strobe clock SC as shown in the timing diagram 300. Next, at an identifying block 1420, there is performed identifying the discrete minimum time offset value DMITOV by selectively adding (by incrementing) the discrete time delays 220 in the strobe clock line SCL whilst the maximum delay data bit patterns MADDBP are sent until the processor 140 receives the test data TDA in a steady-state condition at the commencement of one of the data valid windows DVWs. The result of the identifying block 1420 is the elimination of the time difference X as shown in the timing diagram 400. The process 1400, at an identifying block 1430, then performs identifying the discrete maximum time offset value DMATOV by further selectively adding (by incrementing) the discrete time delays 220 in the strobe clock line SCL whilst the minimum delay data bit patterns MIDDBP are sent and whilst the processor 140 continues to receive the test data TDA in a steady-state condition during data valid windows DVWs the strobe clock SC. The result of the identifying block 1430 is the elimination of the time difference Y as shown in the timing diagrams 500 and 600.

Figure 15:
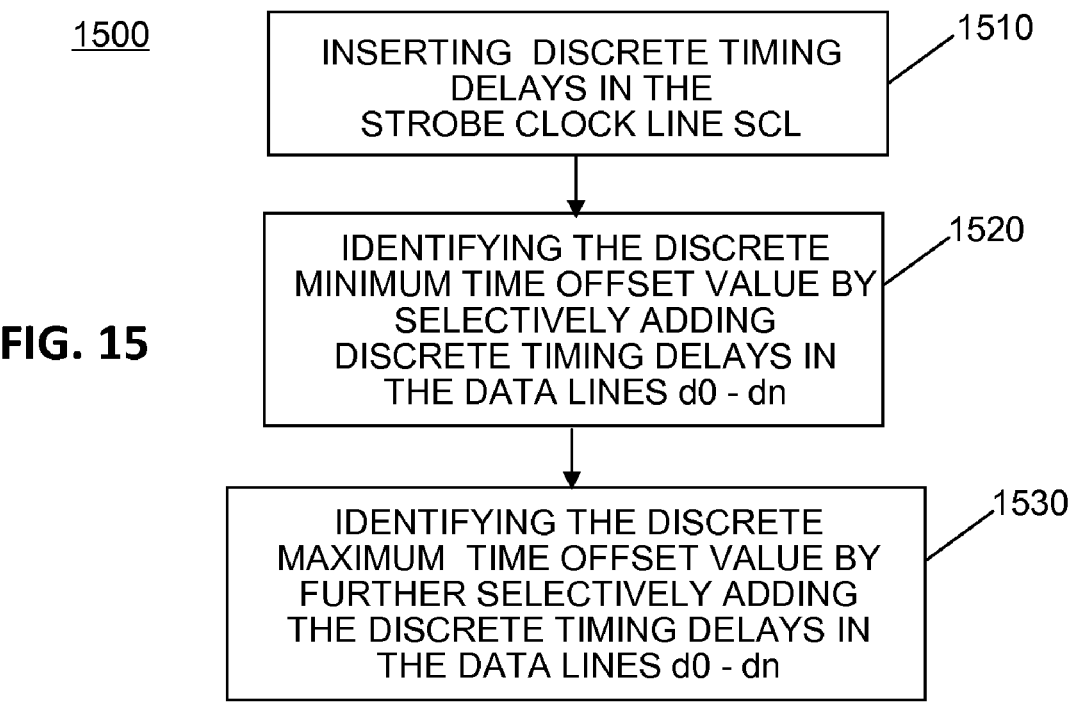
FIG. 15 is a flow chart illustrating yet another alternative identifying process for performing the identifying step of FIG. 11 in accordance with an embodiment of the present invention.

Referring to FIG. 15 a flow chart illustrating another alternative identifying process 1500 to be performed by the identifying block 1130 in accordance with an embodiment of the present invention is shown. The identifying process 1500 includes, at an inserting block 1510, inserting a plurality of the discrete timing delays in the strobe clock line SCL to ensure that initially the test data TDA received by the processor 140 is in a non steady-state condition at the cross-over CS (latching threshold value) of the strobe clock SC. This inserting at block 1510 provides for the time difference X1 (timing offset) of test data TDA on the data bit lines d0 to dn relative to the strobe clock SC as shown in the timing diagram 700. Next, at an identifying block 1520, there is performed identifying the discrete minimum time offset value DMITOV by selectively adding (by incrementing) the discrete time delays 220 in the data lines d0 to dn whilst the minimum delay data bit patterns MIDDBP are sent until the processor 140 receives the test data TDA in a steady-state condition at the commencement of one of the data valid windows DVWs. This inserting at block 1310 provides for the time difference X1 (timing offset) of test data TDA on the data bit lines d0 to dn relative to the strobe clock SC as shown in the timing diagram 700. Next, at an identifying block 1520, there is performed identifying the discrete maximum time offset value DMATOV by further selectively adding (by incrementing) the discrete time delays 220 in the data lines d0 to dn whilst the maximum delay data bit patterns MADDBP are sent and whilst the processor 140 continues to receive the test data TDA in a steady-state condition during data valid windows of the strobe clock SC. The result of the identifying block 1530 is the elimination of the time difference Y1 as shown in the timing diagrams 900 and 1000.

Consider by way of example that there are 8 data bit lines d0 to d7 and the present invention uses the identifying process 1200. Then at the inserting block 1205, the discrete time delays 220 inserted in the strobe clock line SCL provide an initial set up delay in the strobe clock line SCL. The discrete time delays 220, inserted by appropriate de-selection (open circuit) of some of the switches 230 (SW1 to SWm), would typically be approximately equivalent to the duration of the steady-state data SSD plus maximum possible skew of both the memory 120 and link 110.

At the inserting block 1210 each of the data bit lines d0 to d7 would typically have all the discrete time delays 220 inserted by de-selection (open circuit) of all of the switches 230 (SW01 to SW0m; SW11 to SW1m; ... SWn1 to SWnm). Furthermore, in this embodiment there are twenty discrete time delays 220 in each of the chains 210 and each of the discrete time delays 220 has a delay of 1 ps. Also, by way of example, the possible timing of data test data TDA, for each data bit line d0 to d7, relative to the strobe clock line SCL (as shown in FIG. 3) could be as follows: the time difference X for d0=7 ps; the time difference X for d1=6 ps; the time difference X for d2=8 ps; the time difference X for d3=10 ps; the time difference X for d4=9 ps; the time difference X for d5=7 ps; the time difference X for d6=11 ps; and the time difference X for d7=12 ps.

After the identifying block 1220, the time difference X for each of the data bit lines d0 to d7 has been eliminated by the selective removal of the discrete time delays 220 as shown in FIG. 4. Thus, the remaining number of discrete time delays 220, in the data bit lines d0 to d7, identify the discrete maximum time offset value DMATOV for each data bit line. The remaining number of discrete time delays 220 identifying the discrete maximum time offset value DMATOV of a data bit line are as follows: 13 discrete delays remain in d0=13 ps; 14 discrete delays remain in d1=14 ps; 12 discrete delays remain in d2=12 ps; 10 discrete delays remain in d3=10 ps; 11 discrete delays remain in d4=11 ps; 13 discrete delays remain in d5=13 ps; 9 discrete delays remain in d6=9 ps; and 8 discrete delays remain in d7=8 ps.

At the beginning of the identifying block 1230 the time difference Y (as shown in FIG. 5) is required to be eliminated for each data bit line d0 to d7. By way of example, the time difference Y could be as follows: the time difference Y for d0=4 ps; the time difference Y for d1=3 ps; the time difference Y for d2=6 ps; the time difference Y for d3=7 ps; the time difference Y for d4=5 ps; the time difference Y for d5=4 ps; the time difference Y for d6=4 ps; and the time difference Y for d7=3 ps.

After the completion of the identifying block 1230 the time difference Y for each of the data bit lines d0 to d7 has been eliminated by the selective removal of the discrete time delays 220 as shown in FIG. 6. Thus, the remaining number of discrete time delays 220 in the data bit lines d0 to d7 identifies the discrete minimum time offset value DMITOV for each data bit line. The remaining number of discrete time delays 220 identifies the discrete minimum time offset value DMI- TOV of a data bit line are as follows: 9 discrete delays remain in d0=9 ps; 11 discrete delays remain in d1=11 ps; 6 discrete delays remain in d2=6 ps; 3 discrete delays remain in d3=3 ps; 6 discrete delays remain in d4=6 ps; 9 discrete delays remain in d5=9 ps; 5 discrete delays remain in d6=5 ps; and 5 discrete delays remain in d7=5 ps.

The values of the discrete minimum time offset value DMITOV and discrete maximum time offset value DMATOV identify the valid range VR for each of the data bit lines d0 to d7. Hence, the valid range VR for each of the data bit lines d0 to d7 are as follows: VR for d0=9 ps to 13 ps (9 discrete time delays 220 to 13 discrete time delays 220); VR for d1=11 ps to 14 ps (11 discrete time delays 220 to 14 discrete time delays 220); VR for d2=6 ps to 12 ps (6 discrete time delays 220 to 12 discrete time delays 220); VR for d3=3 ps to 10 ps (3 discrete time delays 220 to 10 discrete time delays 220); VR for d4=6 ps to 11 ps (6 discrete time delays 220 to 11 discrete time delays 220); VR for d5=9 ps to 13 ps (9 discrete time delays 220 to 13 discrete time delays 220); VR for d6=5 ps to 9 ps (5 discrete time delays 220 to 9 discrete time delays 220); and VR for d7=5 ps to 8 ps (5 discrete time delays 220 to 8 discrete time delays 220).

In this example, based on FIGS. 11 and 12, the VRL of each of the data bit lines d0 to d7 is determined at the selecting block 1140. Hence, the VRL for each of the data bit lines d0 to d7 are as follows: VRL for d0=4 ps (4 discrete time delays 220); VRL for d1=3 ps (3 discrete time delays 220); VRL for d2=6 ps (6 discrete time delays 220); VRL for d3=7 ps (7 discrete time delays 220); VRL for d4=5 ps (5 discrete time delays 220); VRL for d5=4 ps (4 discrete time delays 220); VRL for d6=4 ps (4 discrete time delays 220); and VRL for d7=3 ps (3 discrete time delays 220).

The data bits are aligned using the VRL at the aligning block 1150 by appropriate inclusion or removal of the time delays 220. More specifically, one of the data bit lines is selected as a reference data bit line and the midpoint of its VRL is selected as a reference discrete mid range offset value. The mid-points of the VRLs of all the other data bit lines are then aligned to the reference discrete mid-range offset value. More specifically, the shift for each data bit is calculated by taking the difference of VRL of that bit with respect to a Reference Valid Range Length RVRL and dividing by 2. For example, if d0 is selected as the reference data bit line then the discrete VRL of data bit line d0 is a Reference VRL (RVRL). Accordingly, the following selective addition (inclusion) or removal of the discrete time delays 220 in each data bit line d1 to d7 is required: RVRL for d0=4 ps (4 discrete time delays 220); 1 discrete time delays 220 removed for d1{(4−3)/2}; 1 discrete time delays 220 added for d2{(4−6)/2}; 2 discrete time delays 220 added for d3; 1 discrete time delays 220 added for d4; no adjustment for d5; no adjustment for d6; and 1 discrete time delays 220 removed for d7.

In this example and embodiment, the method 1100, at the adjusting block 1160, performs adjusting the discrete time delays 220 of the strobe clock line SCL so there would be 2 discrete time delays 220 removed in the strobe clock line SCL in addition to the already inserted discrete time delays 220 that provide the initial set up delay. More specifically, these 2 discrete time delays were determined by identifying a mid range value MRV of the VRL of the reference data bit line d0. This VRL is identified by calculating the difference between the discrete minimum time offset value DMITOV and discrete maximum time offset value DMATOV (13−9=4). Thus, since the valid range length is 4, then mid or middle range value MRV is either 2 or 3 and in this example 2 has been selected.

Although the identifying process 1200 has been described by way of example, exemplary values and calculations associated with identifying process 1300, 1400 and 1500 will be readily understood by a person skilled in the art and therefore are not described herein. However, it should be noted that process 1500 uses the VRL for selecting the discrete mid-range offset value and aligning whereas processes 1300 and 1400 do not use the VRL for selecting the mid-range offset value and aligning. Instead, processes 1300 and 1400 determine the discrete mid-range offset value_as a value that is intermediate the discrete minimum time offset value and a discrete maximum time offset value. Bits are then aligned using the discrete MROVs by comparing with the RMROV. For instance, using the example given above, the discrete mid-range offset value DMROV for processes 1300 and 1400 would be as follows: for d0=11 ps; for d1=12 ps; for d2=9 ps; for d3=6 ps; for d4=8 ps; for d5=11; for d6=7 ps; and for d7=6 ps.

Advantageously, the present invention requires relatively few data bit patterns in order to identify the both the discrete minimum time offset value DMITOV and discrete maximum time offset value DMATOV. As a result, the present invention provides for compensating for skewing of the data and strobe clock timing without the need for unnecessarily large numbers of data bit patterns and therefore all the data bits do to do will be aligned and de-skewed from any static and dynamic delays due to memory 120 and interconnects of the system 100.

More specifically, the present invention makes it possible to identify the Data Valid Range for each data bit by locating discrete minimum time offset value DMITOV and discrete maximum time offset value DMATOV for each of the data bit lines d0 to do using common maximum delay data bit pattern MADDBP and by the alternating one's complement minimum delay data bit patterns MIDDBP. This limited set of pattern will identify the maximum skewing range and will align the bits for the optimum Setup/Hold Margins.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A method for compensating for variations in timing of data sent on data bit lines relative to a strobe clock sent on a strobe clock line, wherein the data bit lines and the strobe clock line form a link coupling a memory to a processing circuit and wherein the processing circuit comprises a processor and selectable discrete time delays insertable between the processor and link and wherein the strobe clock and the data are sent concurrently over the link from the memory to the processor, the method comprising:

sending a request for selected data bit patterns to be sent from the memory to the processing circuit on the data bit lines, the request being sent from the processing circuit to the memory;

receiving at the processing circuit a set of strobe clocks and the selected data bit patterns, the set of strobe clocks being sent on the strobe clock line and each strobe clock in the set of strobe clocks is sent concurrently from the memory with one of the selected data bit patterns, wherein the selected data bit patterns comprise two alternately received maximum delay data bit patterns that are a one's complement of each other and are common for all of the data bit lines and two alternately received minimum delay data bit patterns for each one of the data bit lines, the two minimum delay data bit patterns being a one's complement of each other;

identifying a discrete minimum time offset value and a discrete maximum time offset value for test data in the selected data bit patterns for each one of the data bit lines, wherein the discrete minimum time offset value is a minimum timing adjustment required to allow the processor to receive the test data in a steady-state condition during a data valid window of the strobe clock and the discrete maximum time offset value is a maximum timing adjustment required to allow the processor to receive the test data in a steady-state condition during a data valid window of the strobe clock, and wherein the discrete minimum time offset value and discrete maximum time offset value identify a valid range when each one of the data bit lines supply data in a steady-state condition for latching into the processor by the strobe clock;

selecting a discrete mid range offset value for each one of the data bit lines, the discrete mid range offset value being determined from the discrete minimum time offset value and a discrete maximum time offset value; and aligning the discrete mid range offset value of each of the data bit lines by selective inclusion or removal of at least one of the discrete time delays between the processor and link so that the discrete mid range offset value of each of the data bit lines has a common mid range value.

2. The method for compensating for variations in data timing of claim 1, further comprising:

adjusting the discrete time delays of the strobe clock line by selective inclusion or removal of at least one of the discrete time delays between the processor and link so that a midpoint value of the data valid window is aligned with the common mid range value.

3. The method for compensating for variations in data timing of claim 1, wherein the maximum delay bit patterns comprise data bits on all data bit lines having the same logic value.

4. The method for compensating for variations in data timing of claim 3, wherein for a selected one of the data bit lines the minimum delay bit patterns comprise data bits on all other data bit lines having a logic value opposite to the a logic value on the selected one of the data bit lines.

5. The method for compensating for variations in data timing of claim 1, wherein the strobe clock has a latching threshold value for latching the data and wherein the identifying step includes:

inserting discrete time delays in the strobe clock line to provide an initial set up delay in the strobe clock line and inserting a plurality of the discrete time delays in the data bit lines to ensure that initially the test data received by the processor is in a non-steady-state condition at the latching threshold value of the strobe clock;

identifying the discrete maximum time offset value by selectively removing the discrete time delays in the data bit lines whilst the maximum delay data bit patterns are sent until the processor receives the test data in a steady-state condition at a commencement of one of the data valid windows; and identifying the discrete minimum time offset value by further selectively removing the discrete time delays in the data bit lines whilst the minimum delay data bit patterns are sent and whilst the processor continues to receive the test data in a steady-state condition during data valid windows.

6. The method for compensating for variations in data timing of claim 5, wherein selectively removing and further selectively removing are characterized by decrementing the discrete time delays.

7. The method for compensating for variations in data timing of claim 1, wherein the strobe clock has a latching threshold value for latching the data and, wherein identifying includes:

Inserting discrete time delays in the data bit lines to provide initial setup delays in each of the data bit lines and inserting a plurality of the discrete time delays in the strobe clock line to ensure that initially the test data received by the processor is in a non steady-state condition at the latching threshold value of the strobe clock;

identifying the discrete maximum time offset value by selectively removing the discrete time delays in the strobe clock line whilst the minimum delay data bit patterns are sent until the processor receives the test data in a steady-state condition at a commencement of one of the data valid windows; and identifying the discrete minimum time offset value by further selectively removing the discrete time delays in the strobe clock line whilst the maximum delay data bit patterns are sent and whilst the processor continues to receive the test data in a steady-state condition during data valid windows.

8. The method for compensating for variations in data timing of claim 7, wherein selectively removing and further selectively removing are characterized by decrementing the discrete time delays.

9. The method for compensating for variations in data timing of claim 1, wherein the strobe clock has a latching threshold value for latching the data and wherein identifying includes:

inserting a plurality of the discrete time delays in the data bit lines to ensure that initially the test data received by the processor is in a non steady-state condition at the latching threshold value of the strobe clock;

identifying the discrete minimum time offset value by selectively adding the discrete time delays in the strobe clock line whilst the maximum delay data bit patterns are sent until the processor receives the test data in a steady-state condition at a commencement of one of the data valid windows; and identifying the discrete maximum time offset value by further selectively adding the discrete time delays in the strobe clock line whilst the minimum delay data bit patterns are sent and whilst the processor continues to receive the test data in a steady-state condition during data valid windows.

10. The method for compensating for variations in data timing of claim 9, wherein selectively adding and further selectively adding are characterized by incrementing the discrete time delays.

11. The method for compensating for variations in data timing of claim 1, wherein the strobe clock has a latching threshold value for latching the data and wherein identifying includes:

inserting a plurality of the discrete time delays in the strobe clock line to ensure that initially the test data received by the processor is in a non steady-state condition at the latching threshold value of the strobe clock;

identifying the discrete minimum time offset value by selectively adding the discrete time delays in the data lines whilst the minimum delay data bit patterns are sent until the processor receives the test data in a steady-state condition at a commencement of one of the data valid windows; and identifying the discrete maximum time offset value by further selectively adding the discrete time delays in the data lines whilst the maximum delay data bit patterns are sent and whilst the processor continues to receive the test data in a steady-state condition during data valid windows.

12. The method for compensating for variations in data timing of claim 11, wherein selectively adding and further selectively adding are characterized by incrementing the discrete time delays.

13. The method for compensating for variations in data timing of claim 1, wherein the aligning the discrete mid-range offset value includes adjusting the discrete time delays of the strobe clock line by selecting one of the data bit lines as a reference data bit line with a reference discrete mid-range offset value and adding or removing the discrete time delays in one or more of the other data bit lines.

14. The method for compensating for variations in data timing of claim 13, wherein the step of adjusting the discrete time delays of the strobe clock line includes:

identifying a middle range value of a range length of the reference data bit line, the range length being identified by calculating the difference between the discrete minimum time offset value and discrete maximum time offset value thereof; and selectively adding or removing the discrete timing delays in the strobe clock line that provide delay offset equal to the middle range value.

15. The method for compensating for variations in data timing of claim 1, wherein the discrete minimum offset value and discrete maximum offset value are identified counting the discrete time delays.

16. The method for compensating for variations in data timing of claim 1, wherein the adjusting the discrete time delays includes adjusting the discrete time delays of the strobe line to align with the midpoint value of each one of the aligned data bit lines.

17. The method for compensating for variations in data timing of claim 1, wherein the discrete mid-range value offset is a mid-value of a Valid Range Length, wherein the Valid Range Length is the difference between the discrete maximum time offset value and the discrete minimum time offset value.

18. The method for compensating for variations in data timing of claim 1, wherein the discrete mid-range value offset is an average value of the discrete minimum time offset value and discrete maximum time offset value.

19. In a system having a link between a memory and a processing circuit formed from data bit lines and a strobe clock line, wherein the processing circuit includes a processor and selectable discrete time delays insertable between the processor and link, a method for compensating for variations in timing of data sent over the data bit lines relative to a strobe clock sent on the strobe clock line, and wherein the strobe clock and the data are sent concurrently over the link from the memory to the processor, the method comprising the steps of:

sending a request for selected data bit patterns to be sent from the memory to the processing circuit on the data bit lines, the request being sent from the processing circuit to the memory;

receiving at the processing circuit a set of strobe clocks and the selected data bit patterns, the set of strobe clocks being sent on the strobe clock line and each strobe clock in the set of strobe clocks is sent concurrently from the memory with one of the selected data bit patterns, wherein the selected data bit patterns comprise two alternately received maximum delay data bit patterns that are a one's complement of each other and are common for all of the data bit lines and two alternately received minimum delay data bit patterns for each one of the data bit lines, the two minimum delay data bit patterns being a one's complement of each other;

identifying a discrete minimum time offset value and a discrete maximum time offset value for test data in the selected data bit patterns for each one of the data bit lines, wherein the discrete minimum time offset value is a minimum timing adjustment required to allow the processor to receive the test data in a steady-state condition during a data valid window of the strobe clock and the discrete maximum time offset value is a maximum timing adjustment required to allow the processor to receive the test data in a steady-state condition during a data valid window of the strobe clock, and wherein the discrete minimum time offset value and discrete maximum time offset value identify a valid range when each one of the data bit lines supply data in a steady-state condition for latching into the processor by the strobe clock;

selecting a discrete mid-range offset value for the valid range of each one of the data bit lines, the discrete mid range offset value being determined from the discrete minimum time offset value and a discrete maximum time offset value; and aligning the discrete mid range offset value of each of the data bit lines by selective inclusion or removal of at least one of the discrete time delays between the processor and link so that the discrete mid range offset value of each of the data bit lines has a common mid range value.

20. The method of claim 19, further comprising:

adjusting the discrete time delays of the strobe clock line by selective inclusion or removal of at least one of the discrete time delays between the processor and link so that a midpoint value of the data valid window is aligned with the common mid range value.

* * * * *